UNITED STATES PATENT OFFICE.

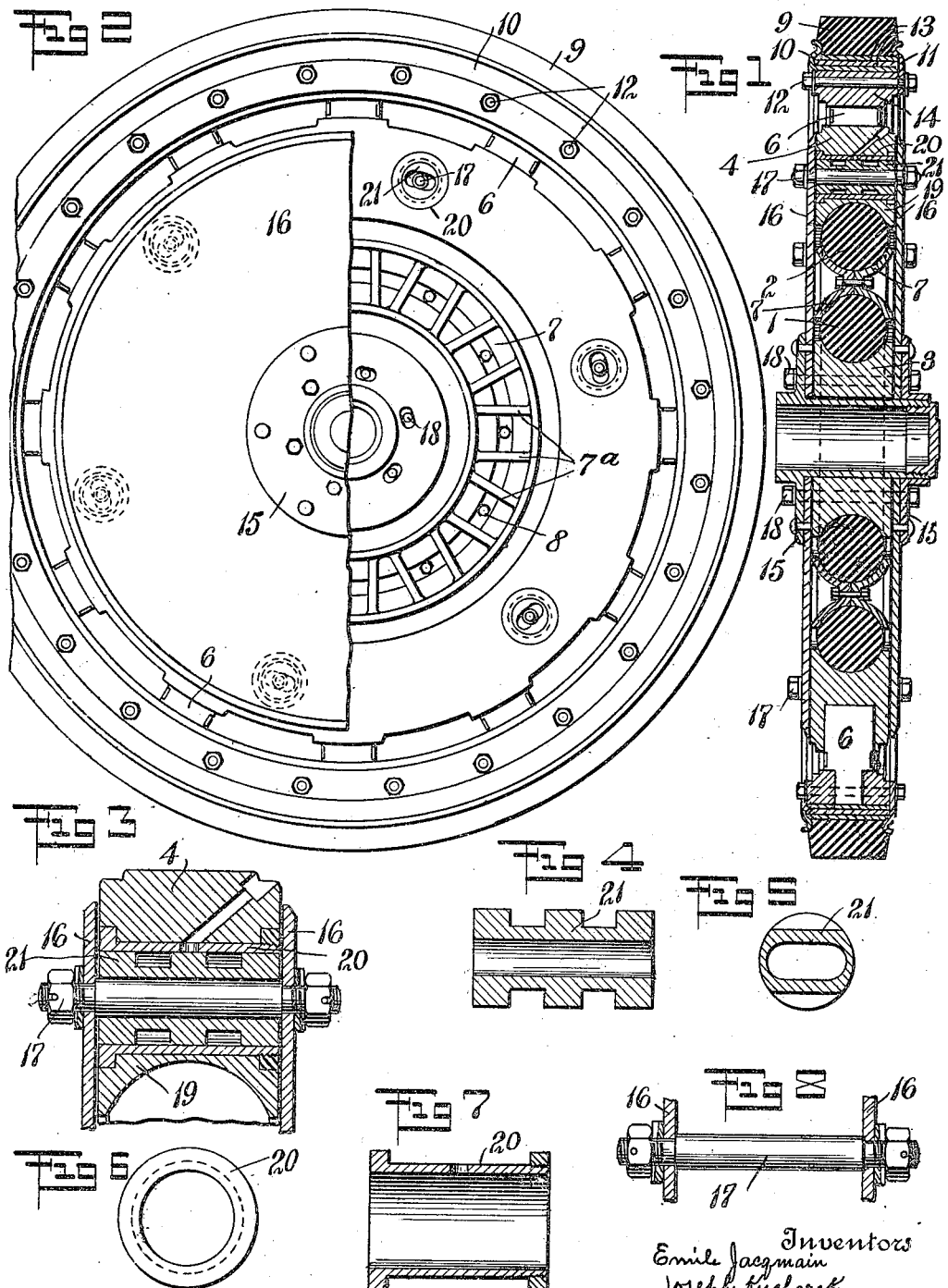

EMILE JACQMAIN AND JOSEPH KUCHAREK, OF BRUSSELS, BELGIUM.

ELASTIC WHEEL.

1,323,060. Specification of Letters Patent. Patented Nov. 25, 1919.

Application filed April 7, 1917, Serial No. 160,538. Renewed September 9, 1919. Serial No. 322,752.

*To all whom it may concern:*

Be it known that we, EMILE JACQMAIN and JOSEPH KUCHAREK, subjects of Belgium and Russia, respectively, residing at Brussels, Belgium, have invented certain new and useful Improvements in Elastic Wheels, of which the following is a specification.

Resilient or elastic wheels are known, wherein a plurality of concentric rims are provided independently of each other and with one or more intermediate rubber rings, the outer rim which receives the wheel-spokes acting somewhat in the nature of a second rim. In such constructions it is necessary, in order to get the required elasticity, that there be sufficient play between both the wheel-rims; but at the same time care must be taken that one rim be not driven independently of the other, as that fact would cause excessive wear of the rubber. The prior art constructions known to us have not satisfactorily solved the problem.

The object of the present invention is to avoid the troubles occurring in known wheels, which is effected, according to this invention, by mounting the stud-bolts which traverse the outer rim in movable cylindrical slides, having preferably a boring in form of an elongated slot and resting in turn in bushings disposed in the outer rim, whereas the inner freely movable rim is provided with elongated borings for the stud-bolts, the long axes of which latter borings lie in a circle that is concentric with the wheel hub proper.

The drawing shows an embodiment of the object of this invention, that is with two round or cylindrical rubber bodies.

Figure 1 is a vertical section through the axis of the wheel,

Fig. 2 is a side view of the wheel, the flange or disk of which is removed on the right side, and Figs. 3–8 are detail views of a catch or carrier piece on a larger scale.

As previously set forth, the elastic or resilient members consist substantially of two round or cylindric rings 1 and 2 of rubber, concentrically placed between two annular rims 3 and 4, conveniently made of aluminium, of which the rim 3 is mounted with play on the hub 5 of the wheel, whereas the rim 4 receives the wooden spokes 6 and also the catch or carrier pieces in special holes or cavities.

The rubber rings 1 and 2 are secured in a concentric position by means of two pieces 7, which are connected by means of screw-bolts 8 and constitute grooves in the form of semi-circles, wherein the rings 1 and 2 are located. The members 7 are laterally connected together by transverse brace bars 7ª.

The tread band of the wheel consists of a solid tire 9 placed upon the steel rim 10 and secured by means of screw-bolts 12 through the medium of a counter-plate 11. Metallic reinforcement or stiffening pieces 13 are embedded in the rubber mass to prevent the tire from working loose. To replace a worn out tire it is only necessary to remove the screws 12 and the counter-plate 11. The steel rim 10 surrounds the wooden felly 14, wherein the spokes 6 are located or inserted.

The rotary movement is transmitted from the motor shaft upon the wheel in the following manner: On the flanges 15 of the inner or central rim are secured two disks or plates 16, which are maintained at equal distance from each other by means of stud-bolts 17 and 18. The bolts 17 traverse the outer rim 4, to which the wheel proper is rigidly or firmly secured or with which it is integral, and so effect the engagement or drive of the wheel. The stud-bolts 18 in the same manner traverse the rim 3 mounted upon the inner hub 5. In order to secure any desired elasticity of the wheel and especially of the outer rim, notwithstanding the presence of the stud-bolts, the rim 4 is provided with a number of openings or slots corresponding to the number of stud-bolts. In each opening 19 is placed a bushing 20, wherein a cylindrical slide or block 21 is movably inserted; these slides have an elongated opening to receive the stud-bolts 17. Each stud-bolt 17 forms with the slide 21 located in the box 20 a catch or carrier piece. It appears from the description given above of the different pieces, that the stud-bolts 17 carry the outer rim 4, whereby the slide 21 is allowed to play in its box under the action of shocks and blows to which the rim is subject; consequently the rim is also allowed to move without being hindered by the stud-bolts, as the resistance is avoided by a revolution or rotation of the slide.

Every slide 21 has of course the required lubricating device and the friction is reduced to a minimum, as appears from the Figs. 3 and 5.

The inner rim 3, which is traversed by the carrier stud-bolts 18, and which is mounted upon the inner or central hub does not require the same movable arrangement of the cylindrical slides as in the case of the rim 4. But in order to prevent a too sudden impulse or drive of the rim 3, which would involve great strain and destruction of the rubber, the stud-bolts 18 traverse the rim 3 with sufficient play.

Claims:

1. In an elastic or resilient wheel, the combination with an inner and an outer rim, of resilient means between said rims, side plates carried by said inner rim, said outer rim having transverse openings therein, a bushing in each of said openings, a cylindrical block movable in each bushing and having an elongated opening therethrough, bolts traversing said outer rim and passing loosely through the openings in said blocks, and bolts traversing the inner rim.

2. In an elastic or resilient wheel, the combination with an inner rim and an outer rim, of resilient means between said rims, side plates carried by said inner rim, said outer rim having a series of transverse openings therein concentric with the wheel, a bushing in each of said openings, a cylindrical block in each of said bushings, said blocks having elliptical openings therethrough, bolts traversing said outer rim and passing loosely through the openings in said block, there being a series of elongated openings in said inner rim, the major axes of which are arranged in a circle concentric with the wheel hub proper, and bolts passing loosely through said last mentioned openings.

In testimony whereof we affix our signatures.

EMILE JACQMAIN.
JOSEPH KUCHAREK.